Jan. 2, 1962     F. E. ZIELINSKI     3,015,174
MOTOR GRADER
Filed Oct. 17, 1958     2 Sheets-Sheet 1
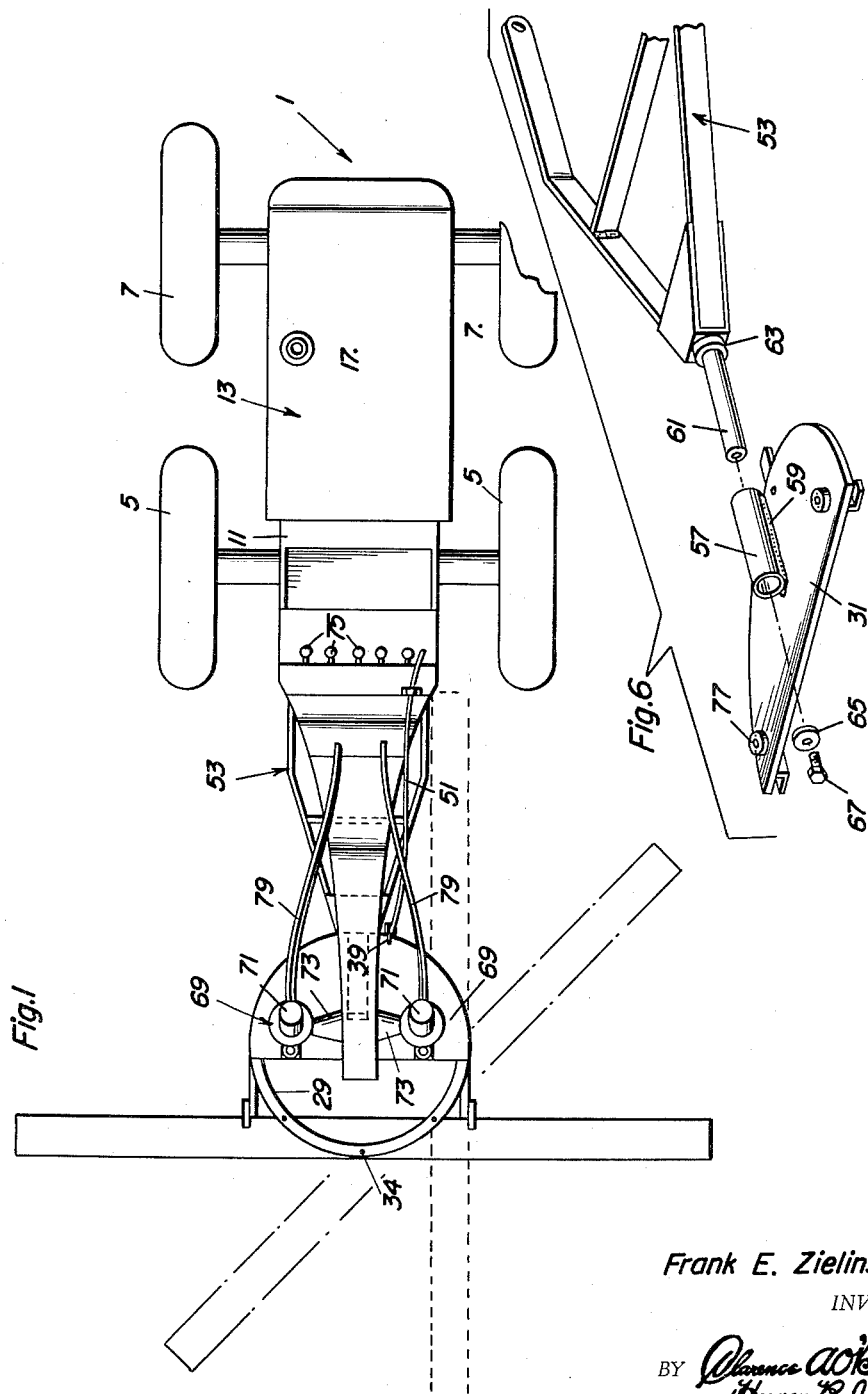
Frank E. Zielinski
INVENTOR.
BY *Clarence A. O'Brien*
*and Harvey B. Jacobson*
Attorneys Jan. 2, 1962 F. E. ZIELINSKI 3,015,174
MOTOR GRADER
Filed Oct. 17, 1958 2 Sheets-Sheet 2
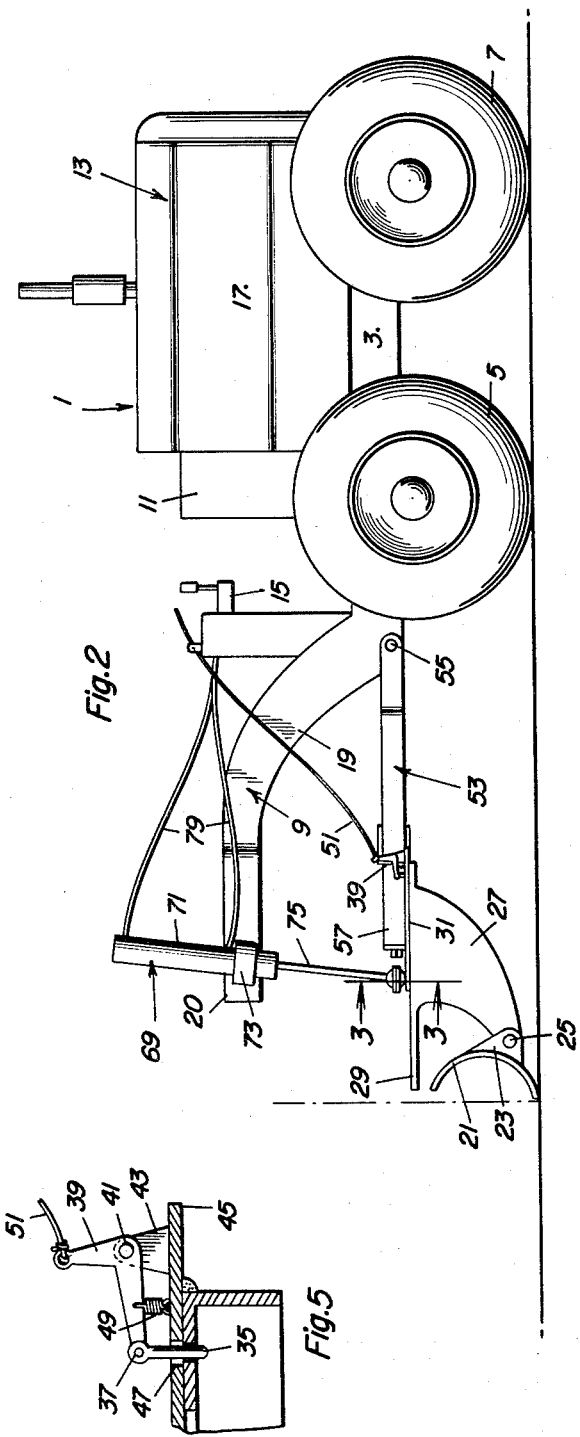
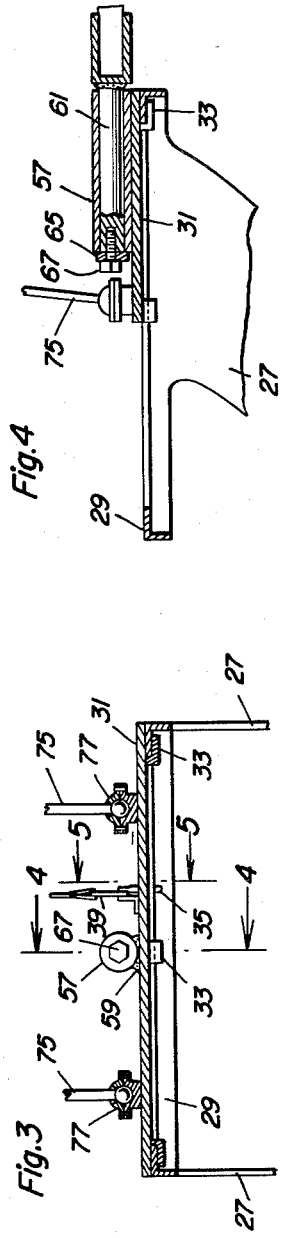
Frank E. Zielinski
INVENTOR.

United States Patent Office 3,015,174
Patented Jan. 2, 1962

3,015,174
MOTOR GRADER
Frank E. Zielinski, 2926 S. 48th Court, Cicero 50, Ill.
Filed Oct. 17, 1958, Ser. No. 767,837
3 Claims. (Cl. 37—156)

This invention relates to improvements in motor graders for road work and the like.

By way of premise, conventional motor graders carry the grader blade behind a front end wheel assembly on an upwardly offset forwardly extending front end portion of the chassis frame and because of this arrangement the front end assembly limits the range of operation of the grader in grading close to obstructions such as walls, fences, or curbs because the blade cannot move or reach stone, gravel or dirt fill close to such obstructions.

The primary object of this invention is to provide a motor grader constructed and arranged to overcome the above described disadvantage of conventional motor graders by being adapted to work right up to any obstruction.

Another object is to accomplish the above by providing a motor grader which operates efficiently without the usual front wheel assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in plan partly in broken lines of a motor grader constructed and arranged in accordance with this invention;

FIGURE 2 is a view in side elevation of the same;

FIGURE 3 is an enlarged view in vertical cross-section taken on the line 3—3 of FIGURE 2;

FIGURE 4 is a view in vertical cross-section taken on the line 4—4 of FIGURE 3;

FIGURE 5 is an enlarged fragmentary view in vertical cross-section taken on the line 5—5 of FIGURE 3; and FIGURE 6 is an enlarged exploded perspective view of parts of mounting means for the grader blade.

Referring by numerals in the drawings of the motor grader of this invention and which is designated generally by the numeral 1, a substantially conventional chassis frame 3 is utilized on front and rear pairs 5, 7 of traction wheels, the chassis frame including the conventional upwardly offset forwardly projecting front end portion 9 extending forwardly of the front wheels 5 and driver's seat 11.

The wheels 5, 7 may be powered by any suitable power plant designated generally 13, and the front wheels 5 arranged for steering in any conventional manner all for automatic control by controls 15 whereby to provide a four wheeled drive automatically controlled tractor 17 and which forms per se no part of this invention except as regards the tractor and front end portion 9 entering into combination with the remaining parts of the grader and the front end portion 9 forming an upwardly offset front crane arm 19 extending forwardly of the chassis frame and front wheels 5 in the longitudinal center of the tractor with a free front end 20.

The grader blade 21 which may be of any suitable shape is mounted to work below and forwardly of the crane arm 19 by the following means. A pair of rear lugs 23 on said blade 21 at opposite sides of the transverse center of said blade 21 are suitably bolted as at 25 to a pair of depending arms 27 on diametrically opposite sides of an annular turntable 29 of angle iron construction.

The turntable 29 is rotatably mounted on the bottom of a semi-circular crown plate 31 concentrically thereof and to extend forwardly thereof and so that said blade 21 is adjustable laterally, substantially horizontally, in different angular positions as shown in full and broken lines in FIGURE 1. For this purpose angle brackets 33 on the bottom of the crown plate 31 and underlapping the turntable 29 secure the turntable to said plate 31.

Means for releasably locking the blade 21 in different laterally adjusted positions is provided. This means comprises an upright locking pin 35 pivoted, as at 37, in depending position on one end of a bell crank 39 pivoted as at 41 on an upstanding lug 43 on a rearwardly extending lug 45 on the crown plate 31. The pin 35 depends through an aperture 47 in the crown plate 31 and the bell crank 39 is spring loaded, as at 49, for rocking in one direction to thrust said pin 35 downwardly into one of a series of circumferentially spaced apertures 34 in the turntable 29 in the different laterally adjusted positions of the blade 21. A pull cable 51 is secured to the other end of the bell crank 39 to rock said bell crank 39 in the opposite direction to raise the locking pin 35 into unlocking position and is adapted to be extended to the driver's seat 11.

A skeleton push-pull frame 53 extends forwardly substantially horizontally from the chassis frame 3 and is operatively connected thereto and to the crown plate 31 for pushing or pulling the grader blade 21 in response to forward or rearward travel of the tractor 17. The frame 53 is of bifurcated construction and extends below the crane arm 19 with its rear end straddling the chassis frame 3 and pivoted thereto, as at 55, for vertical swinging of said frame to compensate for raising and lowering of the grader blade 21 from and into grading positions, respectively, by means presently described.

A radial bearing sleeve 57 welded, as at 59, on top of the crown plate 31 is journaled on a forwardly extending front end spindle 61 on the frame 53 between a rear stop collar 63 on said spindle 61 and a washer 65 secured to the front end of the spindle 61 by a bolt 67. The sleeve 57 and spindle 61 provide means for mounting the crown plate 31 on the frame 53 so that said plate 31, turntable 29 and grader blade 21 are tiltable in opposite directions in a vertical plane about an axis longitudinal to the path of travel of the tractor 17.

For raising and lowering and tilting the grader blade 21 the following means is provided. A pair of like double acting hydraulic rams 69 depend from the front end 20 of the crane arm 19 at opposite sides of said arm and above the crown plate 31, said rams each including a substantially upright hydraulic pressure cylinder 71 swivelled, as at 73, on said arm and a piston rod 75 depending out of said cylinder. The rams 69 are arranged at opposite sides of the axis of tilting of the crown plate 31, turntable 29 and blade 21 and the piston rods are terminally attached to the crown plate by ball and socket joints 77 at opposite sides of said axis of tilting. Hydraulic hose lines 79 are provided on the cylinders for extension to the tractor 17 and connection in any suitable manner to the usual hydraulic system, not shown, of such grader tractors and control in any conventional manner for operating the rams 69. As will be seen the rams 69 suspend the crown plate 31, turntable 29 and blade 21.

Any necessary sidewise or transverse swiveling of the hydraulic ram 69 can be provided in any conventional manner, as for example by a swivel or universal connection such as that shown in the patent to Baumgartner No. 2,281,224 as applied to the cylinder 71 and the arm 73 of that patent.

The operation of the described grader 1 will be readily understood. As the tractor 17 travels forwardly or rearwardly the push-pull frame 53 correspondingly moves the crown plate 31, turntable 29 and grader blade 21 as a unit. The rams 69 may be simultaneously operated to lower or raise the crown plate 31 and correspondingly lower or raise the grader blade from and into operative position in any desired degree. The rams 69 may be alternately operated to tilt the crown plate 31 for correspondingly tilting the grader blade 21 in a substantially vertical plane as occasion may require. The scraper blade 21 may be rotated into the desired angular position by setting one end of the blade in the ground or in grading material by tilting said blade when the turntable 29 is unlocked and driving the tractor forwardly until said blade is in the desired rotated position, and in the desired rotated position it will be locked by the locking pin 35. There being no part of the grader in front of the blade 31 it may be operated as close as desired to an obstruction such as the wall represented by the broken line in front of blade 21 as shown in FIGURE 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a motor grader, the combination of a wheeled chassis having an upwardly offset and forwardly projecting cantilevered crane arm, a push-pull frame disposed below said crane arm and directly pivoted at its rear end to said chassis for raising and lowering movement only, a forwardly extending shaft secured to the front end of said push-pull frame, a tubular sleeve rotatably positioned on said shaft, means on the shaft preventing longitudinal movement of said sleeve, a first turntable member secured to said sleeve for tilting movement about the axis of said shaft, a second turntable member rotatably connected to the first turntable member for turning movement about an axis perpendicular to said shaft, a scraper blade carried by said second turntable member, a releasable means for locking said second turntable member against rotation relative to the first turntable member, and a pair of hydraulic cylinders mounted at opposite sides of the front end portion of said crane arm, said cylinders including piston rods operatively connected to opposite side portions of said first turntable member whereby to selectively tilt the latter about the axis of said shaft and raise and lower the same about the pivotal connection of said push-pull frame to said chassis and a valve in the driver's compartment of the motor grader for controlling said cylinders.

2. The combination as defined in claim 1 together with ball and socket joints operatively connecting said piston rods to said first turntable member.

3. The device as defined in claim 1 wherein said means for locking said second turntable member comprise a projectable and retractable locking pin carried on said first turntable member and receivable selectively in apertures provided in the second turntable member, remotely controlled means for releasing said locking pin and spring means for automatically forcing said pin in said apertures.

References Cited in the file of this patent

UNITED STATES PATENTS

| | | |
|---|---|---|
| 1,819,466 | Jersey | Aug. 18, 1931 |
| 1,877,879 | Iverson | Sept. 20, 1932 |
| 2,281,224 | Baumgartner | Apr. 28, 1942 |